United States Patent
Salazar et al.

(12)

(10) Patent No.: US 11,019,893 B1
(45) Date of Patent: Jun. 1, 2021

(54) HIKING POLE WITH RETRACTABLE BLADE

(71) Applicants: David Salazar, Bayfield, CO (US); Nancy Salazar, Bayfield, CO (US)

(72) Inventors: David Salazar, Bayfield, CO (US); Nancy Salazar, Bayfield, CO (US)

(*) Notice: Subject to any disclaimer, the term of this patent is extended or adjusted under 35 U.S.C. 154(b) by 0 days.

(21) Appl. No.: 17/071,522

(22) Filed: Oct. 15, 2020

Related U.S. Application Data

(60) Provisional application No. 62/993,124, filed on Mar. 23, 2020.

(51) Int. Cl.
| | |
|---|---|
| *A45B 3/14* | (2006.01) |
| *A45B 9/04* | (2006.01) |
| *A45B 9/02* | (2006.01) |
| *B26B 11/00* | (2006.01) |
| *G01C 17/04* | (2006.01) |
| *B26B 1/08* | (2006.01) |
| *A45B 9/00* | (2006.01) |

(52) U.S. Cl.
CPC .............. *A45B 3/14* (2013.01); *A45B 9/02* (2013.01); *A45B 9/04* (2013.01); *B26B 1/08* (2013.01); *B26B 11/00* (2013.01); *G01C 17/04* (2013.01); *A45B 2009/005* (2013.01); *A45B 2009/007* (2013.01); *A45B 2009/025* (2013.01); *A45B 2200/05* (2013.01)

(58) Field of Classification Search
CPC ........................................................ A45B 3/14
USPC ................................. 135/80, 81, 70
See application file for complete search history.

(56) References Cited

U.S. PATENT DOCUMENTS

| | | | | |
|---|---|---|---|---|
| 8,346 A | * | 9/1851 | Hudson ..................... | A45B 3/14 135/66 |
| 51,677 A | * | 12/1865 | Allamby et al. ......... | A45B 9/04 135/81 |
| 350,249 A | * | 10/1886 | Holman .................... | A45B 3/14 135/66 |
| 404,303 A | * | 5/1889 | Remillard ............ | A61H 3/0288 135/70 |
| 857,047 A | * | 6/1907 | Gehrer ..................... | A45B 3/14 135/66 |
| 862,455 A | * | 8/1907 | Dunkel ................ | A61H 3/0288 135/70 |
| 1,164,608 A | * | 12/1915 | Care .................... | A61H 3/0288 135/70 |
| 2,437,076 A | * | 3/1948 | Clemens .............. | A61H 3/0288 135/70 |
| 4,977,914 A | * | 12/1990 | Smerker .................. | A45B 9/04 135/70 |
| 9,044,072 B2 | | 6/2015 | Lindsay, Jr. et al. | |
| 2002/0116768 A1 | | 8/2002 | Grassi | |
| 2004/0060587 A1 | | 4/2004 | Morosini et al. | |
| 2005/0211284 A1 | | 9/2005 | Dooley | |
| 2011/0139201 A1 | | 6/2011 | Haddad | |
| 2013/0312796 A1 | | 11/2013 | Dietz | |

\* cited by examiner

*Primary Examiner* — Noah Chandler Hawk
(74) *Attorney, Agent, or Firm* — Boudwin Intellectual Property; Daniel Boudwin

(57) ABSTRACT

A hiking pole with a retractable blade is shown and described. The hiking pole with a retractable blade includes an elongated pole having a first end and a second end. The second end or the elongated pole has a retractable blade affixed thereto. The blade will extend past the second end when not retracted.

15 Claims, 5 Drawing Sheets

HIKING POLE WITH RETRACTABLE BLADE

CROSS REFERENCE TO RELATED APPLICATIONS

This application claims the benefit of U.S. Provisional Application No. 62/993,124 filed on Mar. 23, 2020. The above identified patent application is herein incorporated by reference in its entirety to provide continuity of disclosure.

BACKGROUND OF THE INVENTION

The present invention relates to defensive hiking poles. More particularly, the present invention provides a hiking pole with a retractable blade to allow an individual to defend themselves as needed.

Many individuals enjoy outdoor activities. Often, these outdoor activities involve hiking or walking through the woods. This can lead people into rough terrain. As a result, many individuals carry walking sticks with them. In some instances, specialized hiking poles are used.

Hiking often leads individuals into remote areas of nature. These remote areas may leave people vulnerable to attack from animals or other humans. This leads many to want to have some sort of personal defense device. Oftentimes a firearm is not allowed in areas where hiking occurs. Further, other self-defense options are not readily accessible and effective.

Consequently, there is a need for an improvement in the art of defending oneself while hiking. The present invention substantially diverges in design elements from the known art while at the same time solves a problem many people face when needing a defensive weapon while hiking. In this regard the present invention substantially fulfills these needs.

SUMMARY OF THE INVENTION

The present invention provides a hiking pole with a retractable blade wherein the same can be utilized for providing convenience for the user when hiking through the woods and wanting a personal defense item. The hiking pole with a retractable blade is comprised of an elongated pole having a first end and a second end. The second end of the elongated pole has a retractable blade affixed thereto. The blade will extend past the second end when not retracted.

Another object of the hiking pole with a retractable blade is to provide a rod that is movably attached parallel to the elongated pole. The rod is connected to the retractable blade at one end.

Another object of the hiking pole with a retractable blade is to provide a blade housing which stores the blade within. The blade housing has an opening to allow the blade to be extended from the housing. The blade housing is secured to the elongated pole.

Another object of the hiking pole with a retractable blade is to provide a spring assisted opening device located within the blade housing.

Another object of the hiking pole with a retractable blade is to provide an openable flap located over the opening of the blade housing.

Another object of the hiking pole with a retractable blade is to provide a handle attached to the elongated pole at the first end.

Another object of the hiking pole with a retractable blade is to provide a compass attached to the first end of the elongated pole.

Another object of the hiking pole with a retractable blade is to provide a skirt located about the second end of the elongated rod.

Another object of the hiking pole with a retractable blade is to provide a wrist strap secured to the first end of the elongated pole.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

Figure 1:
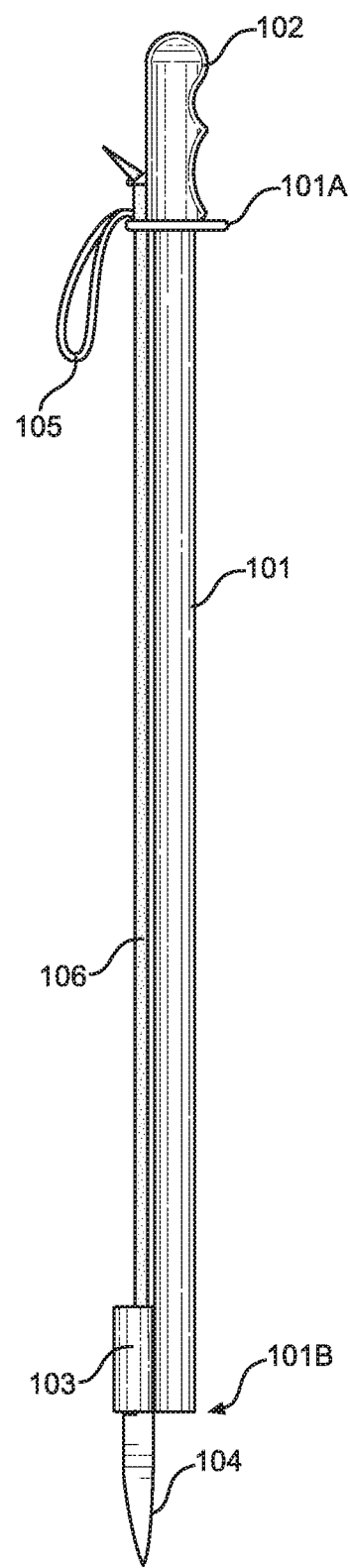
FIG. 1 shows a perspective view of an embodiment of a fixed hiking pole with a retractable blade.

With regard to the reference numerals used, the following numbering is used throughout the drawings.
101 Elongated Pole
101A First end of the elongated pole
101B Second end of the elongated pole
102 Handle
103 Blade housing
104 Blade
104A Straight blade
104B Partially serrated blade
104C Serrated blade
105 Wrist wrap
106 Elongated rod
201 Skirt
202 Telescopic sections
203 Adjusters
301 Compass
302 Channel in blade housing
303 Activation button
401 Prongs
403 Aperture
501 Aperture
502 Flap
503 Spike
601 Handle member 602 Blade member
603 Aperture

DETAILED DESCRIPTION OF THE INVENTION

Reference is made herein to the attached drawings. Like reference numerals are used throughout the drawings to depict like or similar elements of the hiking pole with a retractable blade. For the purposes of presenting a brief and clear description of the present invention, a preferred embodiment will be discussed as used for the hiking pole with a retractable blade. The figures are intended for representative purposes only and should not be considered to be limiting in any respect.

Figure 2:
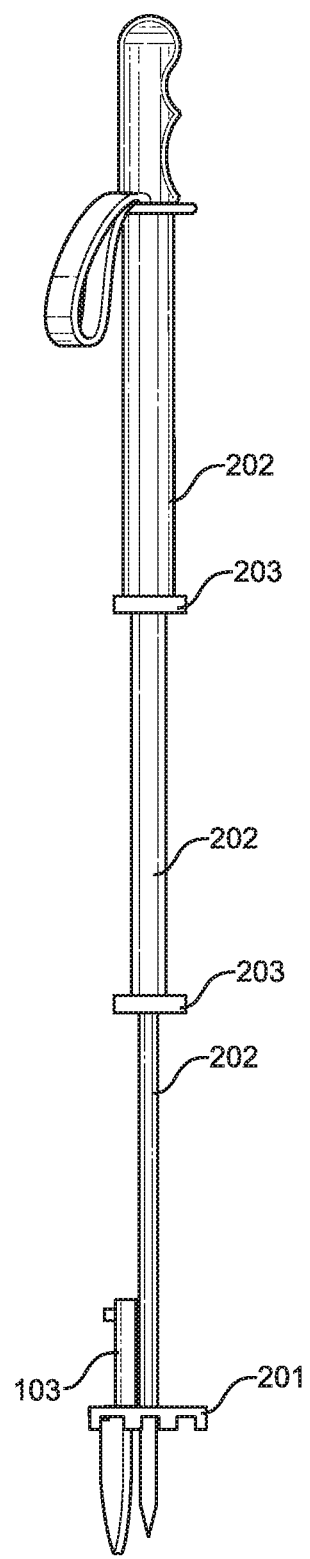
FIG. 2 shows a perspective view of an embodiment of an adjustable hiking pole with retractable blade.

Referring now to FIG. 1, there is shown a perspective view of an embodiment of a fixed hiking pole with a retractable blade. The device is comprised of an elongated pole 101. The elongated pole has a first end 101A and a second end 101B. The elongated pole 101 is of different lengths in different embodiments. In one embodiment the elongated pole 101 is a fixed pole. In another embodiment as shown in FIG. 2 the elongated pole 101 is adjustable. In some embodiments, the elongated pole 101 has a pointed tip at the second end 101B.

In one embodiment, the first end 101A of the elongated pole 101 has a handle 102 attached thereto. In one embodiment, the handle 102 is padded to provide a comfortable gripping surface. In another embodiment, the handle 102 has an ergonomic grip. This grip will better fit to a human hand when grasped. In one embodiment, a wrist loop 105 is secured to the elongated pole 101. The wrist loop 105 will prevent the elongated pole 101 from falling if accidentally released.

The elongated pole 101 has a blade 104 secured thereto. The blade 104 is a retractable blade and fits within a blade housing 103. The blade housing 103 has an opening at one end that will allow the blade 104 to fit therethrough. The blade 104 is configured to fit within the blade housing 103 entirely. In one embodiment, the blade 104 is secured to an elongated rod 106. The elongated rod 106 will move the blade 104 from a retracted position to an extended position. The elongated rod 106 is movably secured along the elongated pole 101 via a plurality of fasteners. In one embodiment the elongated rod 106 will terminate near the handle 102 such that it can be easily accessed via the handle 102. In one embodiment the elongated rod 106 will extend into the handle 102 such that it is easily operated when holding the handle.

Referring now to FIG. 2, there is shown a perspective view of an embodiment of an adjustable hiking pole with retractable blade. In one embodiment, the hiking pole has a skirt 201 affixed to the second end of the hiking pole. In one embodiment, the skirt 201 is removably secured to the hiking pole. The skirt 201 will prevent the hiking pole from sinking into the ground. In some cases, the skirt 201 will prevent the hiking pole from becoming stuck in rocks. Another reason for the skirt 201 is that the skirt 201 will prevent the blade housing 103 from contacting the ground when in a retracted position.

In one embodiment, the hiking pole has an adjustable length. In the shown embodiment, the hiking pole is made up of three telescopic sections 202. Each telescopic section 202 is sized fit within the section above it. This will allow the hiking pole to be extended or shortened as necessary. In many embodiments the telescopic sections 202 are held in place via adjusters 203. In one embodiment, the adjusters 203 are a ball detent system. In this system, a plurality of apertures will be found on each telescopic section 202. In one embodiment, the adjusters 203 are tightening fasteners as described in the description of FIG. 3.

Figure 3:
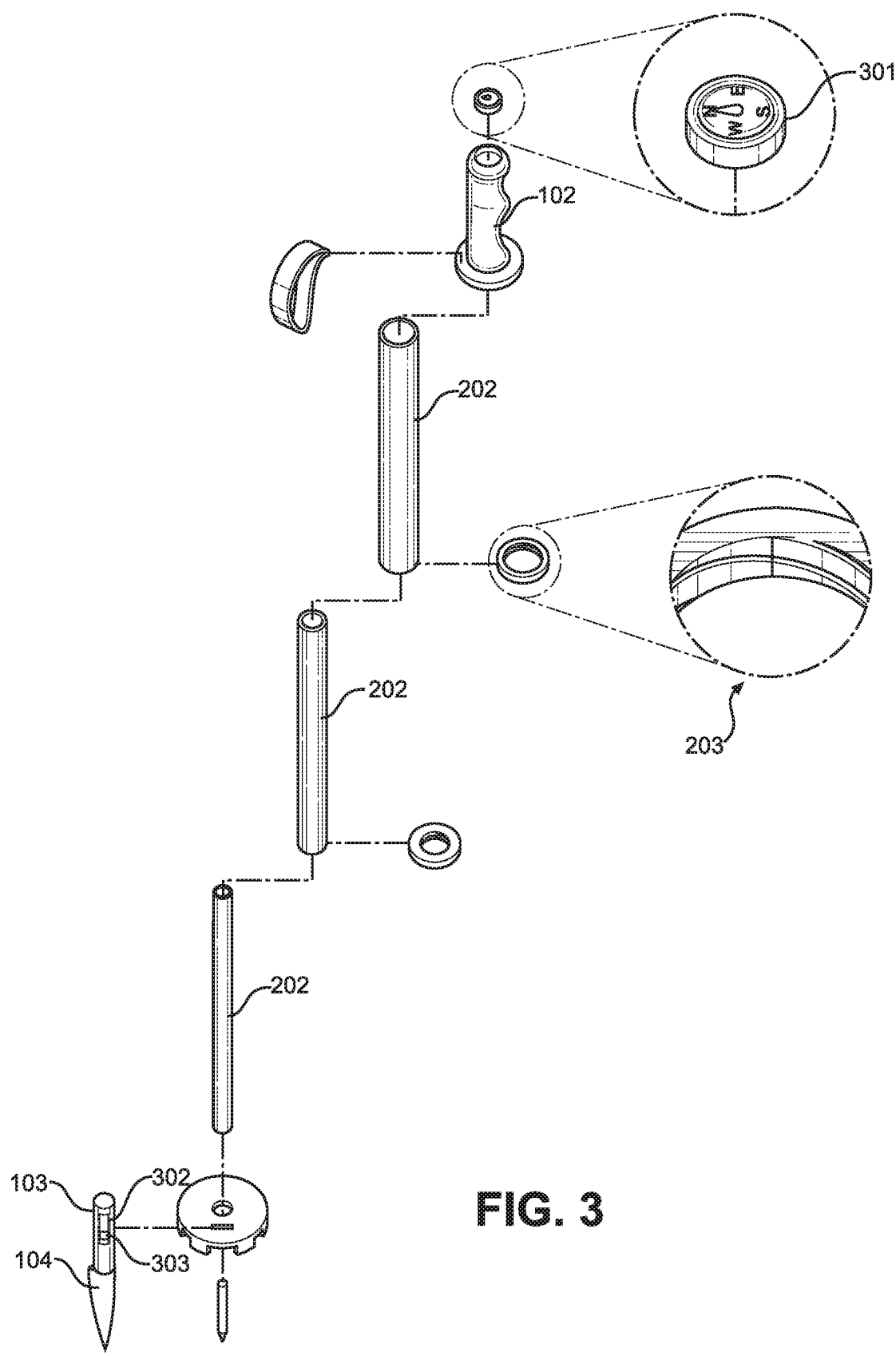
FIG. 3 shows an exploded view of an embodiment of an adjustable hiking pole with a retractable blade.

Referring now to FIG. 3, there is shown an exploded view of an embodiment of an adjustable hiking pole with a retractable blade. In one embodiment, the handle 102 has a compass 301 secured thereto. The compass 301 is located on the top of the handle such that a user will be able to see it when hiking. This will help ensure a user is hiking in the right direction.

In one embodiment, the blade is activated via an activation button on the blade housing 103. In this embodiment the blade housing 103 has a channel 302 located therein. The channel 302 will serve as a guide path for an activation button 303. The activation button 303 will trigger a release. When the activation button 303 is triggered the blade 104 will extend from the blade housing 103 and into a working position.

In one embodiment, each telescopic sections 202 will have an adjuster 203 located at one end. In one embodiment, a first part of the adjuster 203 is a male threaded device. The second part of the adjuster 203 is a female threaded device. When the devices are screwed together the male threaded device will clamp down on the telescopic section 202 holding it at the desired length.

Figure 4:
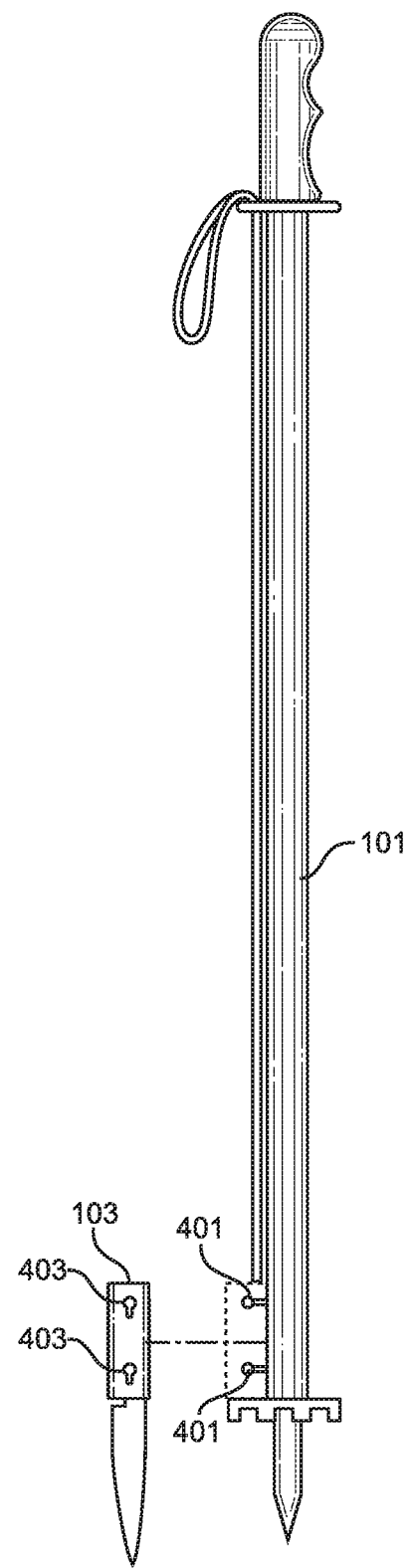
FIG. 4 shows a perspective view of an embodiment of a hiking pole with a removable retractable blade.

Referring now to FIG. 4, there is shown a perspective view of an embodiment of a hiking pole with a removable retractable blade. In one embodiment, the blade housing 103 is removably fixed to the elongated pole 101. This will allow the blade housing 103 to be removed and used as a traditional knife. In one embodiment, the blade housing 103 is secured to the elongated pole 101 by a plurality of prongs 401. The plurality of prongs 401 will engage the blade housing 103, thereby removably securing the blade housing 103 to the elongated pole 101.

In the shown embodiment, the plurality of prongs 401 have a ball located on the end thereof. The ball will engage apertures 403 in the blade housing 103 thereby securing the blade housing 103 to the elongated pole 101. In another embodiment, the prongs 401 will have disks on the end. In such an embodiment, the apertures 403 will have a larger end and a smaller end. This will allow the disks to fit through the larger end of the apertures 403, such that the prongs 401 can then be slid along the aperture 403 to secure the disk within the smaller end. In yet a further embodiment, the apertures 403 will be offset allowing the prongs 401 to pass though the blade housing 103 without interfering with the blade. A securement device can then be attached to the prongs 401 securing the blade housing 103 to the elongated pole 101.

Figure 5:
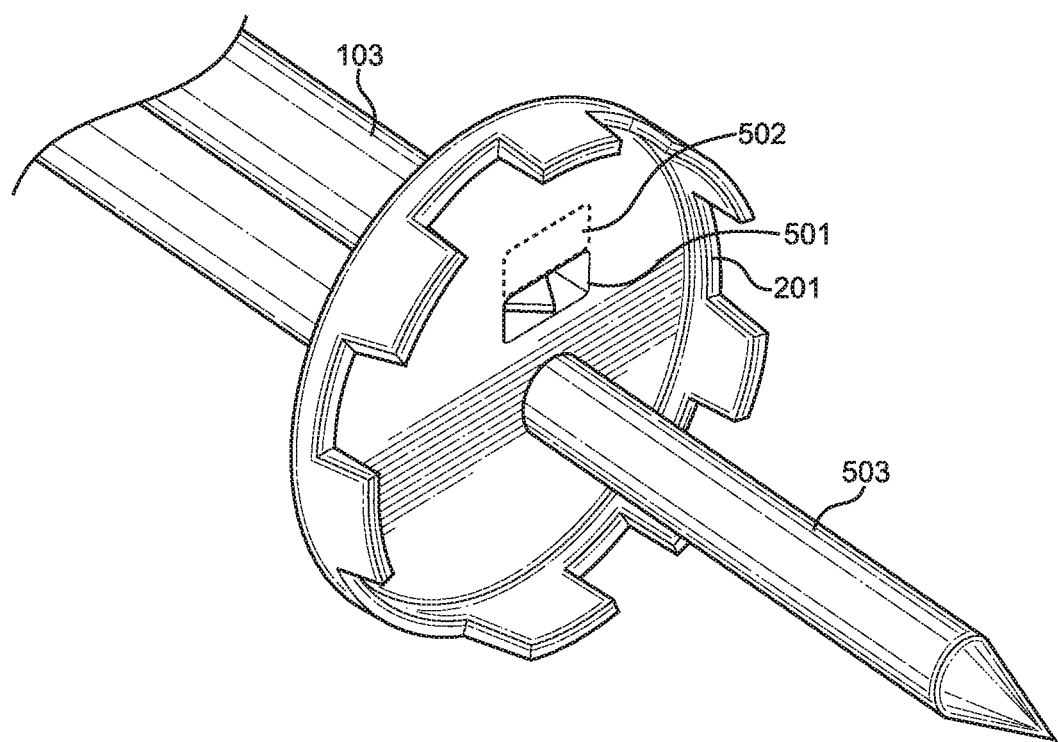
FIG. 5 shows a bottom up view of an embodiment of a hiking pole with a retractable blade.

Referring now to FIG. 5, there is shown a bottom up view of an embodiment of a hiking pole with a retractable blade. In the shown embodiment, the skirt 201 is secured to the second end of the elongated pole 101. In the shown embodiment, the skirt 201 has an aperture 501 therethrough to allow the blade to protrude therethrough. The skirt 201 is opposed to a ground surface when in use. This could, in some instances, cause dirt to enter the blade housing 103. To prevent this, a flap 502 is affixed to the end of the blade housing 103. In one embodiment, the flap 502 is a rubber flap. This will enable to flap 502 to securely fit within the opening of the blade housing 103. Further, the blade will be able to puncture the flap 502 if the flap becomes stuck within the blade housing 103.

In several embodiments there is a ground spike 503 which extends outwardly from the bottom of the elongated pole 101. The ground spike 503 is configured to engage with the ground surface. This will allow for added traction of the hiking pole to better ensure that the hiking pole does not slip. Further, the ground spike should be located below the skirt 201 to ensure that to only a certain length of the ground spike will enter the ground before the skirt 201 prevent further entry.

Figure 6A:
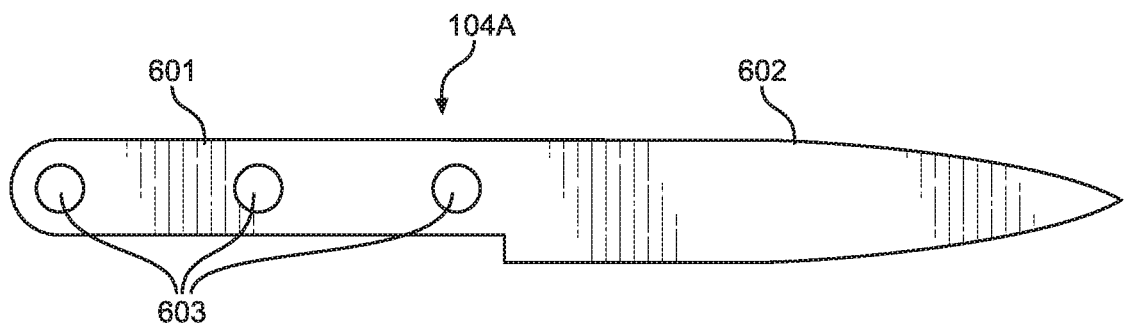
FIG. 6A shows a sideview of an embodiment of a straight blade for use in the hiking pole with retractable blade.
Figure 6B:
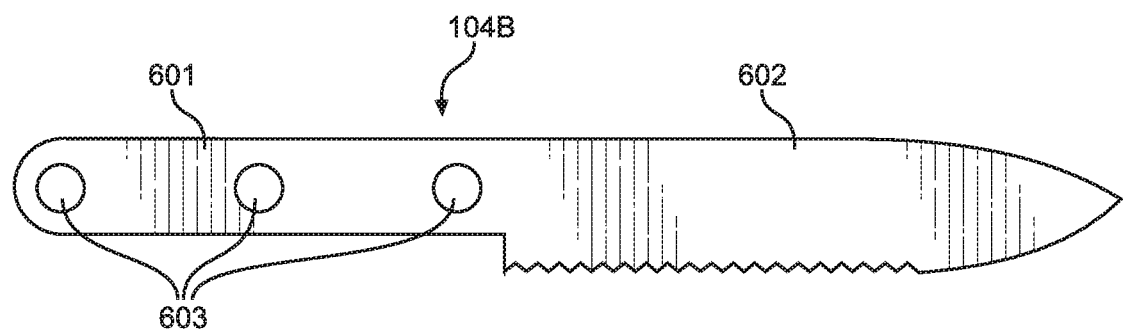
FIG. 6B shows a sideview of an embodiment of a serrated blade for use in the hiking pole with retractable blade.
Figure 6C:
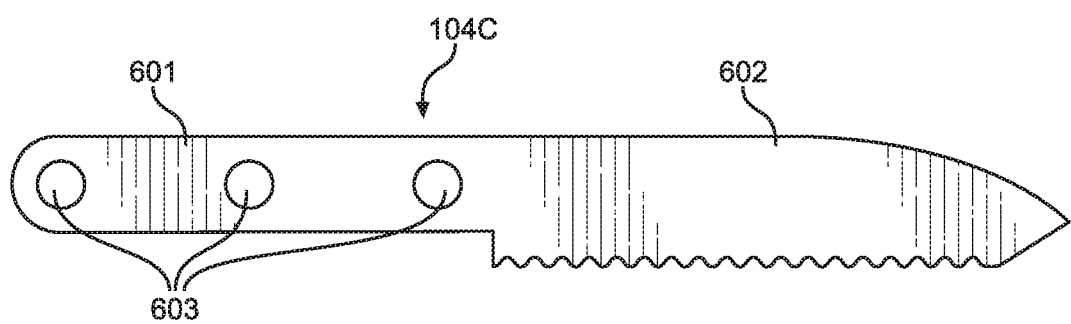
FIG. 6C shows a sideview of an embodiment of a partially serrated blade for use in the hiking pole with retractable blade.

Referring now to FIG. 6A-6C, there is shown side views of embodiments of blades for use in the hiking pole with retractable blade. In some embodiments, the blade is coupled to the housing such that the housing is fixed to the elongated pole and the blade is removable. In one embodiment, the blade has a handle member 601 and a blade member 602. In one embodiment, the handle member 601 has at least one aperture 603 therein. In some embodiments, the at least one aperture 603 will couple to the blade release device.

In different embodiments different blades are used. In one embodiment, a straight blade 104A is used. A straight blade 104A could potentially be used for items such as chopping and cutting in a survival situation. In another embodiment, a serrated blade 104B is used. A serrated blade 104Bb could potentially be used as a saw. In yet a further embodiment, a partially serrated blade 104C is used. A partially serrated blade 104C is versatile and can perform many different tasks as required in a survival setting.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hiking pole with a retractable blade, the hiking pole comprising:
    an elongated pole having a first end and a second end;
    the second end having a retractable blade affixed thereto, wherein the blade extends past the second end when not retracted;
    further comprising a blade housing storing the blade within and having an opening to allow the blade to be extended from the housing, wherein the blade housing is secured to the elongated pole;
    wherein there is an openable flap located over the opening of the blade housing.

2. The hiking pole with a retractable blade of claim 1, further comprising a rod that is movably attached parallel to the elongated pole, wherein the rod is connected to the retractable blade at one end.

3. The hiking pole with a retractable blade of claim 2, wherein the rod is used to extend and retract the blade.

4. The hiking pole with a retractable blade of claim 1, further comprising a spring assisted opening device located within the blade housing.

5. The hiking pole with a retractable blade of claim 1, further comprising a handle attached to the elongated pole at the first end.

6. The hiking pole with a retractable blade of claim 1, further comprising a compass attached to the first end of the elongated pole.

7. The hiking pole with a retractable blade of claim 1, further comprising a skirt located about the second end of the elongated rod.

8. The hiking pole with a retractable blade of claim 1, further comprising a wrist strap secured to the first end of the elongated pole.

9. A hiking pole with a retractable blade, the hiking pole comprising:
    a pole having a first end and a second end, wherein the pole has a telescopically adjustable length;
    the second end having a retractable blade affixed thereto, wherein the blade extends past the second end when not retracted;
    further comprising a blade housing storing the blade within and having an opening to allow the blade to be extended from the housing, wherein the blade housing is secured to the elongated pole;
    wherein there is an openable flap located over the opening of the blade housing.

10. The hiking pole with a retractable blade of claim 9, further comprising a spring assisted opening device located within the blade housing, wherein the blade housing has an activation device attached to the blade housing.

11. The hiking pole with a retractable blade of claim 9, further comprising a handle attached to the elongated pole at the first end.

12. The hiking pole with a retractable blade of claim 9, further comprising a compass attached to the first end of the elongated pole.

13. The hiking pole with a retractable blade of claim 9, further comprising a skirt located about the second end of the elongated rod.

14. The hiking pole with a retractable blade of claim 9, further comprising a wrist strap secured to the first end of the elongated pole.

15. The hiking pole with a retractable blade of claim 9, wherein the retractable blade is removable.

* * * * *